A. ISAACSON & V. BLOOMBERG.
VEHICLE ELEVATING MEANS.
APPLICATION FILED MAR. 22, 1917.
1,245,722.
Patented Nov. 6, 1917.
2 SHEETS—SHEET 1.
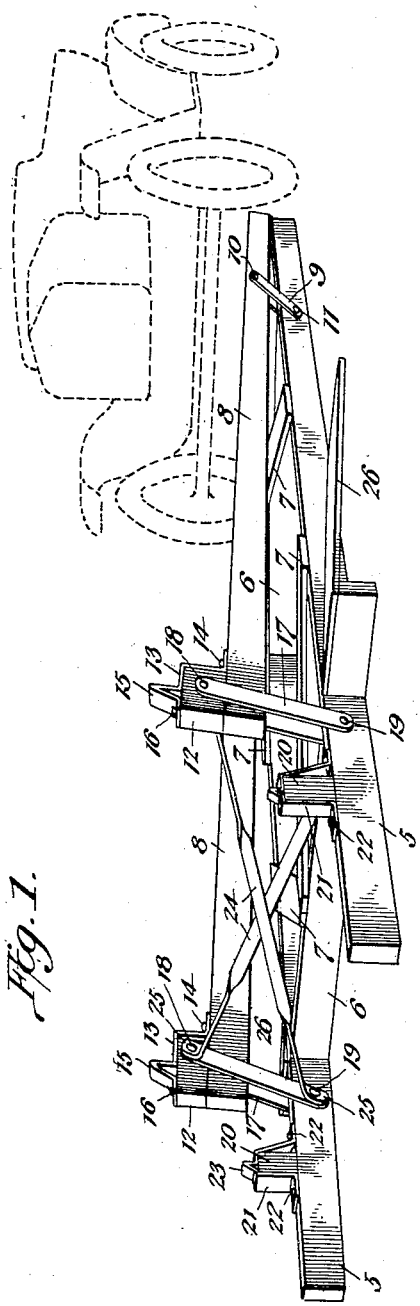
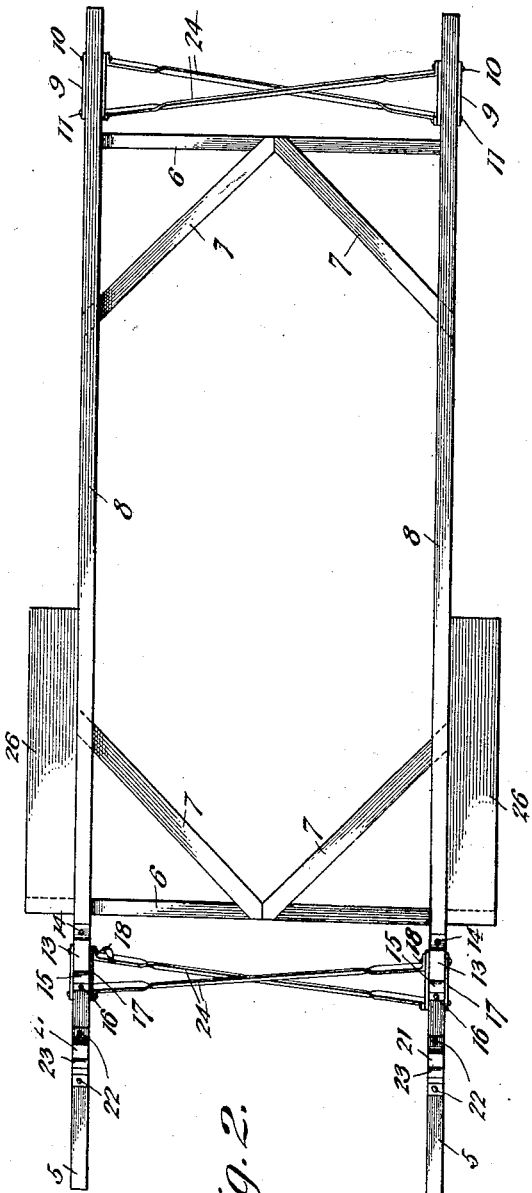
Inventor
Alfred Isaacson
Verner Bloomberg
By
Attorney A. ISAACSON & V. BLOOMBERG.
VEHICLE ELEVATING MEANS.
APPLICATION FILED MAR. 22, 1917.
1,245,722.
Patented Nov. 6, 1917.
2 SHEETS—SHEET 2.
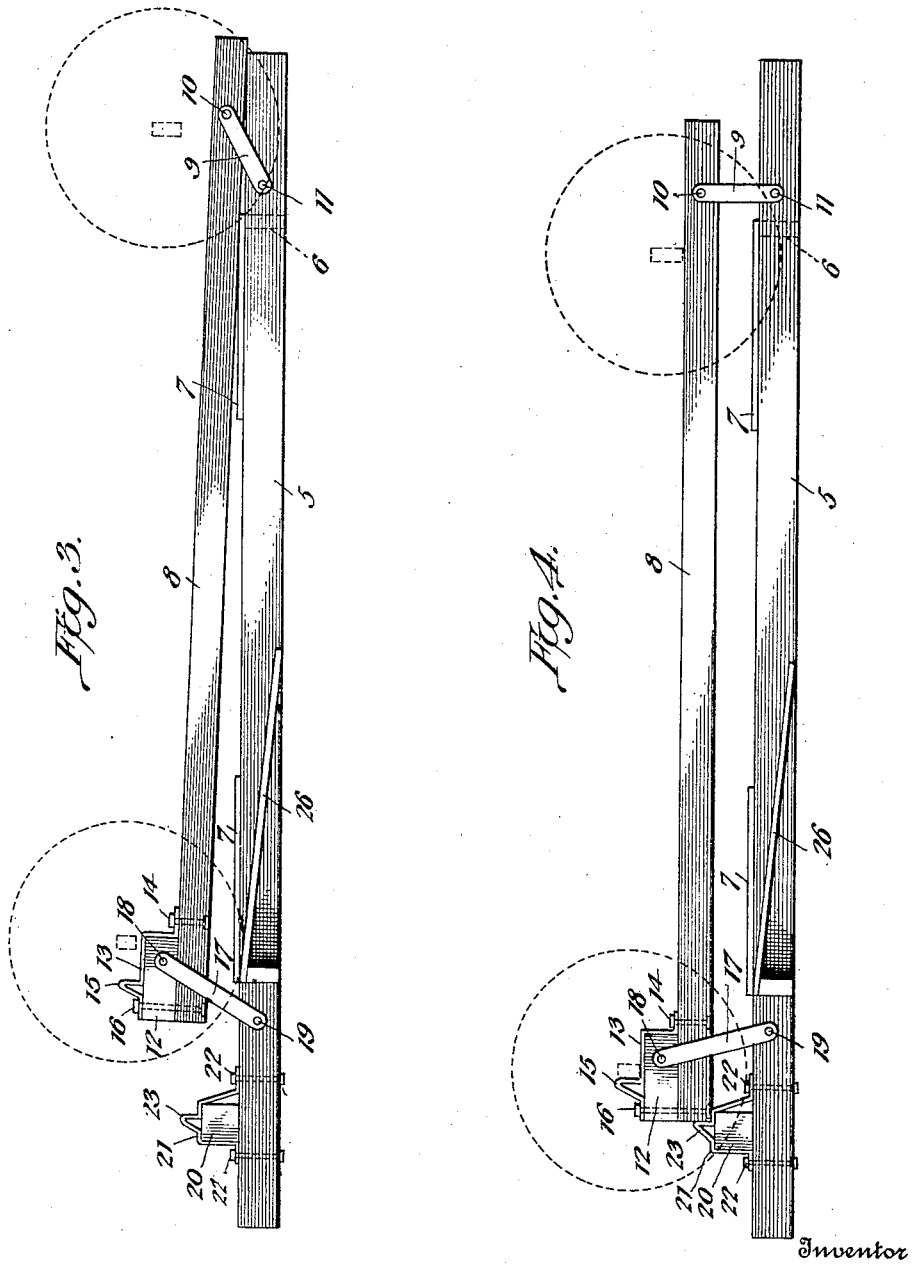

UNITED STATES PATENT OFFICE.

ALFRED ISAACSON AND VERNER BLOOMBERG, OF BRIDGEPORT, KANSAS.

VEHICLE-ELEVATING MEANS.

1,245,722.  Specification of Letters Patent.  Patented Nov. 6, 1917.

Application filed March 22, 1917. Serial No. 156,715.

*To all whom it may concern:*

Be it known that we, ALFRED ISAACSON and VERNER BLOOMBERG, citizens of the United States, residing at Bridgeport, in the county of McPherson and State of Kansas, have invented certain new and useful Improvements in Vehicle-Elevating Means, of which the following is a specification.

The present invention relates to vehicle elevating means, and is more particularly designed for raising automobiles, so that their wheels will be unsupported.

A primary object of the present invention is to provide a simple structure that can be readily built and can also be moved from place to place, this structure at the same time being novel and entirely practical for the purpose.

The preferred embodiment of the invention is illustrated in the accompanying drawings, wherein:—

Figure 1 is a perspective view of the apparatus,

Fig. 2 is a top plan view of the same,

Fig. 3 is a side elevation with the elevating means in depressed position, and

Fig. 4 is a view similar to Fig. 3, but showing the elevating means in raised position.

Similar reference numerals designate corresponding parts in all the figures of the drawings.

In the embodiment disclosed, a base frame is employed, comprising longitudinal side bars 5 connected by cross bars 6, the frame being made rigid by inclined braces 7 connecting the cross bars with the base bars.

Located over the longitudinal side bars 5 are elevating rails 8 that are shorter than the bars 5, each of these rails at one end being mounted on the corresponding end of the base bar beneath it by a pair of links 9 pivoted at their upper ends, as shown at 10 to the rail and at their lower ends as illustrated at 11 to the base bar. The other ends of the rails 8 have mounted thereon supporting blocks 12 on which are located wear straps 13, these straps extending downwardly and resting upon the rails 8 at the inner ends of the blocks where they are secured by bolts 14. The straps 13 are provided with upstanding looped portions 15 constituting axle abutments and directly adjacent to these upstanding portions are disposed vertical bolts 16 that pass downwardly through the blocks 12 and through the ends of the rails 8. The bolts 16 thereby obviously serve as fastening means, both for the blocks and the straps.

Links 17 are pivoted, as shown at 18, to the blocks 12, and are pivoted as at 19 to the bars 5 directly beneath the same. The links 17 are longer than the links 9, or in other words, the distance between the pivots 10 and 11 of said links 9 is less than the distance between the pivots 18 and 19 of the links 17, and the parts are so arranged that when the rails are in their depressed positions, as shown in Fig. 3, their rear ends rest upon the rear ends of the base bars 5, and said rails are disposed at an inclination.

Mounted on the front ends of the base bars 5 are supporting blocks 20, over which pass holding straps 21 secured to the bars 5 by bolts 22, these straps having upstanding portions 23 upon the tops of the blocks 20. It will be noted that when the rails are in elevated position, as shown in Fig. 4, the links 9 are substantially vertical, the links 17 inclined in a slightly forward direction, and the front ends of the rails 8 rest upon the strap 20 and against the abutment projections 23.

In order to rigidly hold the rails against lateral movement two sets of crossed braces 24 are employed, preferably formed of metal bars or straps having their central portions vertically disposed and their end portions horizontally arranged with their terminals offset to provide ears 25. These ears, it will be noted, are secured by the respective pivots 10, 11, 18 and 19, and the braces swing with the links and rails.

In using the device, the rails are first placed in their depressed positions, as shown in Figs. 1 and 3, and the automobile to be elevated is run forwardly astride of the same, upwardly and forwardly inclined runways 26 being located outside the base bars 5. The front axle of the car will thereupon strike the projections 15 and move the rails 8 forwardly. This movement by reason of the links 9 and 17 will cause the elevation of the rails until they assume the position illustrated in Fig. 4, whereupon it will be evident that the wheels of the automobile will be elevated from the floor or surface on which the apparatus rests. To remove the car, it is only necessary to swing the rails rearwardly, and because of the relation of the links 17, this can be easily accomplished. It will be clear that the device is exceedingly simple, and yet experience has demonstrated that it is very practical and useful for the purposes set forth.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described our invention, what we claim as new, and desire to secure by Letters Patent, is:—

1. In combination with a vehicle elevating device having a stationary base frame and spaced elevating side bars pivotally connected thereto; supporting blocks mounted on the forward end of the base frame, and blocks mounted on the elevating side bars and arranged to be located over the blocks of the base frame when the bars are elevated, each of said blocks having a binding strip with an abutment formed thereon, adapted, respectively, to limit the forward movement of the bars and of a vehicle placed thereover.

2. In combination with a vehicle elevating device having a stationary base frame and spaced elevating side bars pivotally connected thereto; supporting blocks mounted on the forward end of the base frame, blocks mounted on the elevating side bars and arranged to be located over the blocks of the base frame when the bars are elevated, and links pivoted to the base frame and the blocks of the elevating bars.

In testimony whereof, we affix our signatures in the presence of two witnesses.

ALFRED ISAACSON.
VERNER BLOOMBERG.

Witnesses:
P. A. TOBIN,
A. H. MILLER.